(12) United States Patent
Okamura (10) Patent No.: US 10,418,884 B2
(45) Date of Patent: Sep. 17, 2019

(54) CONTROLLER-INCLUDED ROTATING ELECTRICAL MACHINE

(71) Applicant: DENSO CORPORATION, Kariya, Aichi-pref. (JP)

(72) Inventor: Tomoyuki Okamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 258 days.

(21) Appl. No.: 15/382,503

(22) Filed: Dec. 16, 2016

(65) Prior Publication Data

US 2017/0179794 A1 Jun. 22, 2017

(30) Foreign Application Priority Data

Dec. 18, 2015 (JP) .................................. 2015-247920

(51) Int. Cl.
*H02K 11/04* (2016.01)
*H02K 5/22* (2006.01)

(52) U.S. Cl.
CPC ........... *H02K 11/046* (2013.01); *H02K 5/225* (2013.01); *H02K 11/048* (2013.01); *H02K 2203/09* (2013.01)

(58) Field of Classification Search
CPC .... H02K 11/046; H02K 5/225; H02K 11/048; H02K 2203/09
See application file for complete search history.

(56) References Cited

U.S. PATENT DOCUMENTS

| 2010/0327709 | A1* | 12/2010 | Minato | H05K 1/18 310/68 D |
| 2011/0175496 | A1* | 7/2011 | Shirakata | H02K 11/048 310/68 R |
| 2013/0154407 | A1 | 6/2013 | Isoda et al. | |
| 2013/0334934 | A1 | 12/2013 | Maeda et al. | |
| 2014/0354087 | A1* | 12/2014 | Kato | H02K 11/046 310/43 |
| 2014/0361648 | A1 | 12/2014 | Shirakata et al. | |
| 2015/0188395 | A1 | 7/2015 | Fujita et al. | |

(Continued)

FOREIGN PATENT DOCUMENTS

| JP | 2007-336638 A | 12/2007 |
| JP | 2015-126602 A | 7/2015 |

(Continued)

*Primary Examiner* — Emily P Pham
(74) *Attorney, Agent, or Firm* — Oliff PLC (57) ABSTRACT

A controller-included rotating electrical machine is provided which includes a rotating electrical machine and a controller. The controller 11 is equipped with a power supply terminal-included bus bar assembly and bus bar assemblies. The power supply terminal-included bus bar assembly has bus bars which are fixedly retained by resin and electrically wire a power modules and also includes a power supply terminal connecting with one of the bus bars. Specifically, the power supply terminal is installed in the power supply terminal-included bus bar assembly along with the bus bars, thereby resulting in decreased number of parts and production steps of the controller-included rotating electrical machine as compared with a conventional structure equipped with a power supply terminal and bus bars which are fabricated as assemblies and a power supply terminal installed in another assembly.

5 Claims, 9 Drawing Sheets

(56) References Cited

U.S. PATENT DOCUMENTS

2015/0229172 A1* 8/2015 Kashihara ............ H02K 11/048
                                                              310/71
2015/0340966 A1* 11/2015 Mutsuura .............. H02M 7/003
                                                              363/98

FOREIGN PATENT DOCUMENTS

| JP | 2015-208137 A | 11/2015 |
| WO | 2013/157065 A1 | 10/2013 |

* cited by examiner

CONTROLLER-INCLUDED ROTATING ELECTRICAL MACHINE

CROSS REFERENCE TO RELATED DOCUMENT

The present application claims the benefit of priority of Japanese Patent Application No. 2015-247920 on Dec. 18, 2015, the disclosure of which is incorporated herein by reference.

BACKGROUND

1. Technical Field

The invention relates generally to a controller-included rotating electrical machine.

2. Background Art

Japanese Patent No. 5528505 teaches a controller-included rotating electrical machine made by a combination of a rotating electrical machine and a controller.

The controller is equipped with an inverter circuit and a rectifier circuit. The inverter circuit works to supply alternating electrical current (AC) to the rotating electrical machine. The rectifier circuit works to convert AC, as supplied from the rotating electrical machine, to direct current (DC). The controller is equipped with a power assembly which constitutes the inverter circuit and the rectifier circuit and a power supply terminal assembly.

The power assembly is a combination of parts which make up the inverter circuit and the rectifier circuit. The power assembly is equipped with power modules a heat sink, and a wire assembly. Each of the power module is made up of six switching devices. The heat sink serves to dissipate thermal energy, as generated by the power module. The wire assembly includes wires which connect the power modules and are secured together by resin. The power modules which are connected to the wires of the wire assembly are secured to the wire assembly. The heat sink is electrically insulated from the power modules and fixed near the power modules. The power supply terminal assembly includes a power supply terminal to which a wire extending from a positive terminal of a battery is joined and wires for use in connecting the power supply terminal to the power modules. The power supply terminal and the wires are retained by resin. The power assembly and the power supply terminal assembly are disposed adjacent each other and mounted on an axially-facing end surface of a housing of the rotating electrical machine using bolts.

The controller-included rotating electrical machine, as apparent from the above discussion, has the power supply terminal to which the wire extending from the positive terminal of the battery and is installed in the power supply terminal assembly. This results in an increase in total number of parts and also an increase in assembling steps of the controller-included rotating electrical machine.

SUMMARY

It is therefore an object to provide a controller-included rotating electrical machine which is made of less parts and in less production steps.

According to one aspect of the invention, there is provided a controller-included rotating electrical machine which comprises: (a) a rotating electrical machine; (b) a plurality of switching device modules each of which includes a plurality of switching devices and constitutes an inverter circuit working to supply alternating current to the rotating electrical machine and a rectifier circuit working to rectify alternating current, as delivered from the rotating electrical machine; (c) a power supply terminal-included bus bar assembly which includes a plurality of kinds of bus bars which electrically wire one of the switching device modules and are fixedly retained by a resin member, the power supply terminal-included bus bar assembly also including a power supply terminal for connection with an electrical conductor extending from a positive pole of a power supply, the power supply terminal being joined to one of the bus bars; and (d) at least one bus bar assembly which includes a plurality of kinds of bus bars which electrically wire one of the switching device modules and are fixedly retained by a resin member.

As apparent from the above discussion, the power supply terminal is installed in the power supply terminal-included bus bar assembly along with the bus bars, thus resulting in a decreased number of parts and production steps of the controller-included rotating electrical machine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

FIGS. 1 to 10 illustrates the controller-included rotating electrical machine 1 according to an embodiment of this disclosure. The controller-included rotating electrical machine 1 will be described below, as an example, as being mounted in a vehicle such as an automobile.

The structure of the controller-included rotating electrical machine 1 will first be described below.

Figure 1:
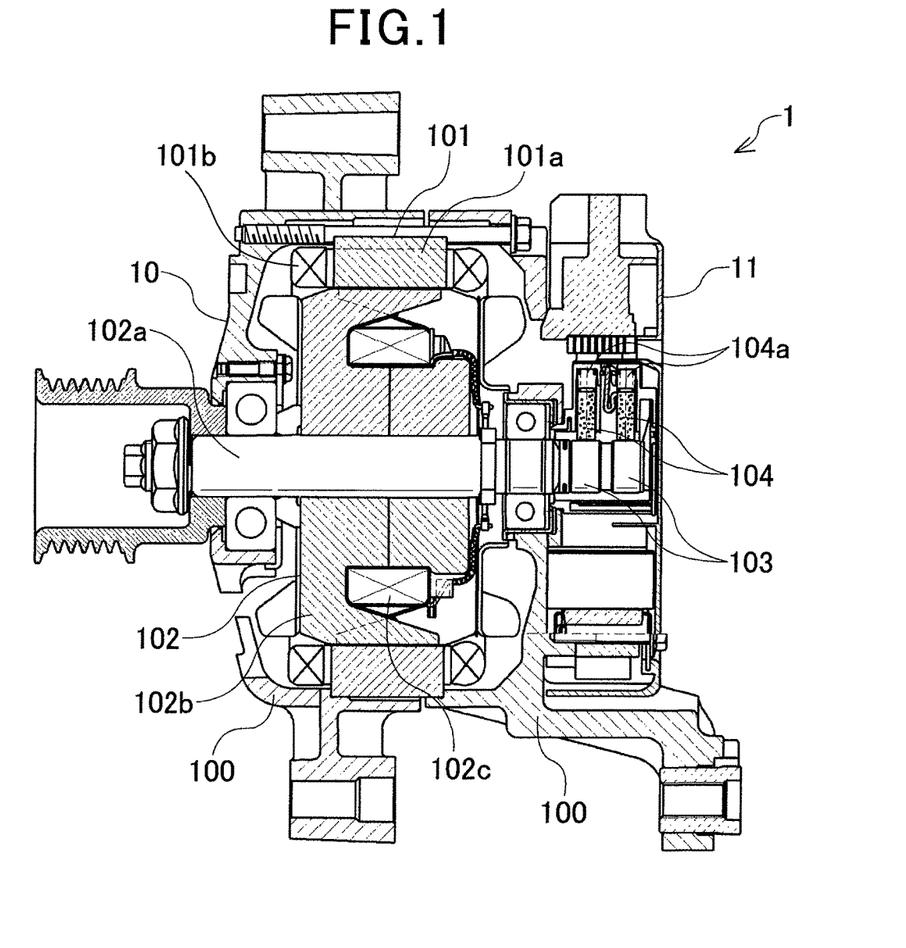
FIG. 1 is an axially sectional view of a controller-included rotating electrical machine according to an embodiment.

The controller-included rotating electrical machine 1 is mounted on the vehicle and supplied with electric power from a battery mounted in the vehicle to work as a drive source to move the vehicle. The controller-included rotating electrical machine 1 is also supplied with torque output from an engine such as an internal combustion engine mounted in the vehicle to work as an electrical generator to produce electrical energy for charging the battery. The controller-included rotating electrical machine 1 is an assembly equipped with the rotating electrical machine 10 and the controller 11.

The rotating electrical machine 10 serves as an actuator to produce power or torque to drive the vehicle and also serves as an electrical generator to generate electric power with aid of an output power from the engine of the vehicle for charging the battery. The rotating electrical machine 10 is equipped with the housing 100, the stator 101, the rotor 102, the slip rings 103, and the brushes 104.

The housing 100 has the stator 101 and the rotor 102 disposed therein and retains the rotor 102 to be rotatable. The housing 100 also has the controller 11 secured thereto.

The stator 101 forms a portion of a magnetic path and produces a rotating magnetic field when electric current flows through the stator 101. The stator 101 also forms a portion of a magnetic path which interlinks with a magnetic flux generated by the rotor 102, as will be described later in detail, to produce alternating current. The stator 101 includes the stator core 101a and the stator winding 101b.

The rotor 102 forms a portion of the magnetic path and works to produce a magnetic pole when electric current flows through the rotor 102. The rotor 102 includes the rotating shaft 102a, the rotor core 102b, and the rotor winding 102c.

The slip rings 103 and the brushes 104 are members which supply direct current to the rotor winding 102c. The slip rings 103 are fit on the outer peripheral surface of the rotating shaft 102a through an insulating member. The brushes 104 are urged by the springs 104a against the rotating shaft 102a to have end surfaces riding on the outer peripheral surface of the slip rings 103. The brushes 104 are retained by brush holders.

Figure 2:
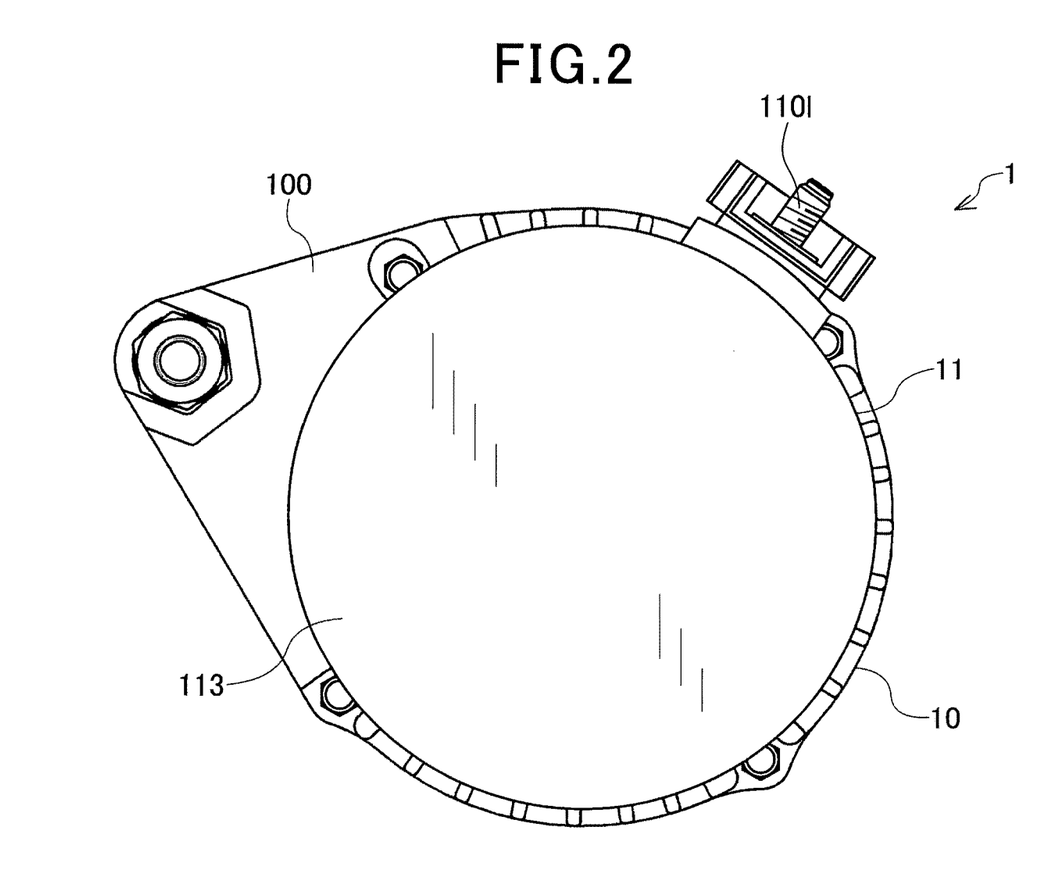
FIG. 2 is a plane view of a controller-included rotating electrical machine, as viewed from a direction facing a controller.

The controller 11 is a device which controls a supply of electric power from the battery to the rotating electrical machine 10 to produce torque in the rotating electrical machine 10. The controller 11 also works to convert the electric power, as produced by the rotating electrical machine 10, to supply it to the battery so that the battery is charged. The controller 11 is equipped with inverter circuits which supply alternating current to the rotating electrical machine 10 and rectifier circuits which convert the alternating current, as delivered from the rotating electrical machine 10, into direct current. The controller 11, as illustrated in FIGS. 2 and 3, includes the power supply terminal-included power assembly 110, the power assemblies 111 and 112, and the cover 113.

Figure 3:
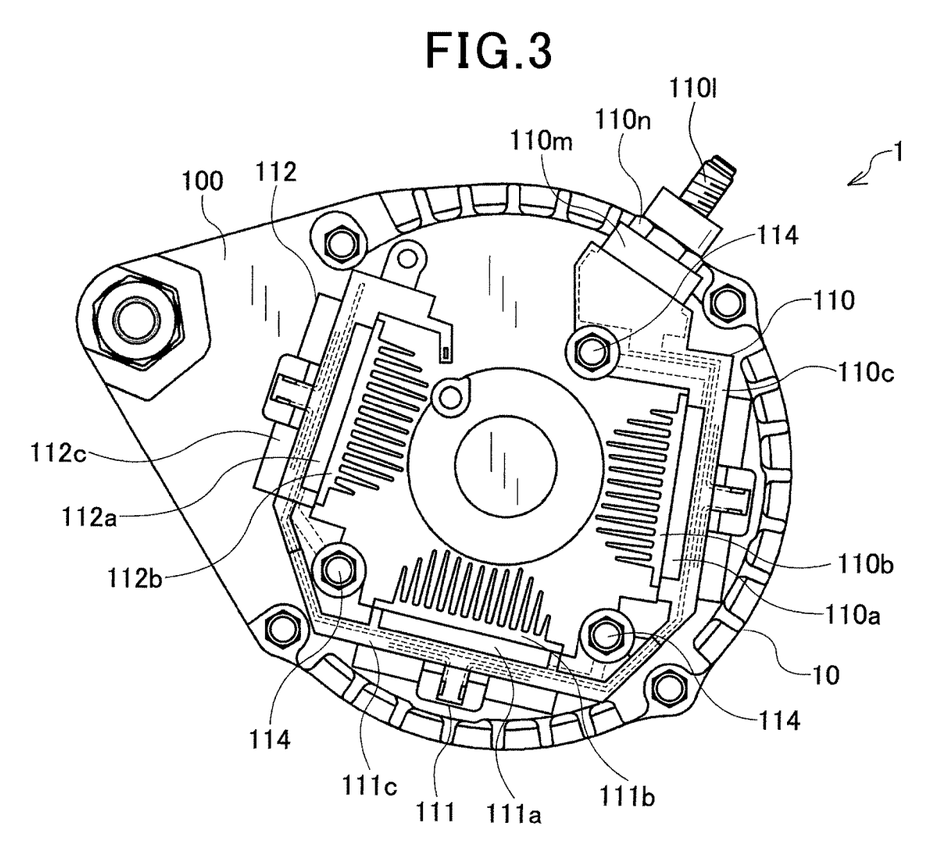
FIG. 3 is a plane view of a controller-included rotating electrical machine from which a cover is removed, as viewed from a direction facing a controller.

The power supply terminal-included power assembly 110 is, as illustrated in FIG. 3, made of an assembly of parts which constitute the inverter circuit and the rectifier circuit. The power supply terminal-included power assembly 110, as illustrated in FIGS. 3 and 4, includes the power module 110a, the heat sink 110b, and the power supply terminal-included bus bar assembly 110c.

Figure 5:
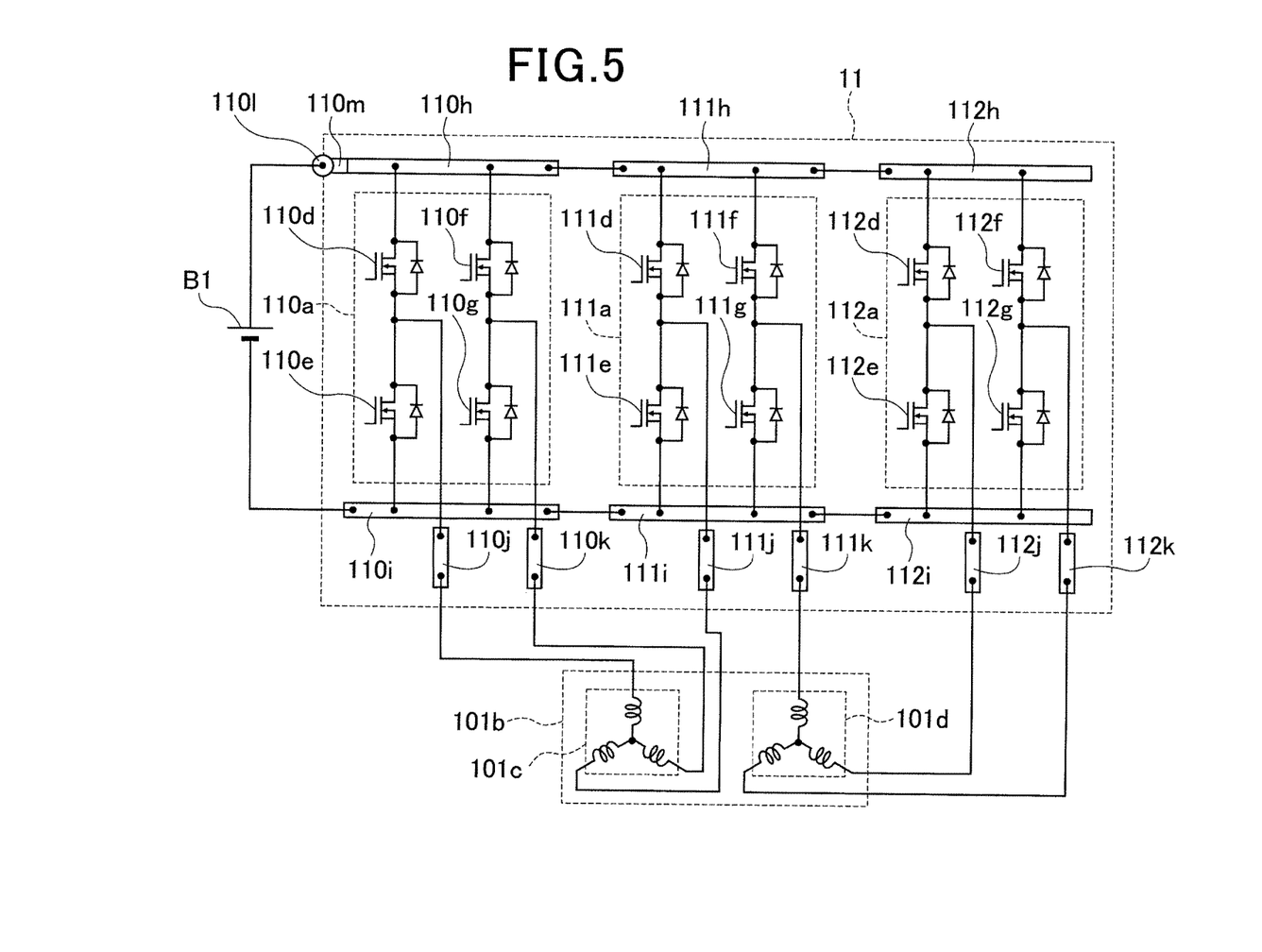
FIG. 5 is a circuit diagram of a controller-included rotating electrical machine of an embodiment.

The power module 110a is, as can be seen in FIG. 5, a switching device module consisting of four switching devices: MOSFETs 110d to 110g which constitute the inverter circuit and the rectifier circuit. The MOSFETs 110d and 110e are connected in series. Similarly, the MOSFETS 110f and 110g are connected in series. The MOSFETs 110d and 110f are joined at sources thereof to drains of the MOSFETs 110e and 110g.

Figure 4:
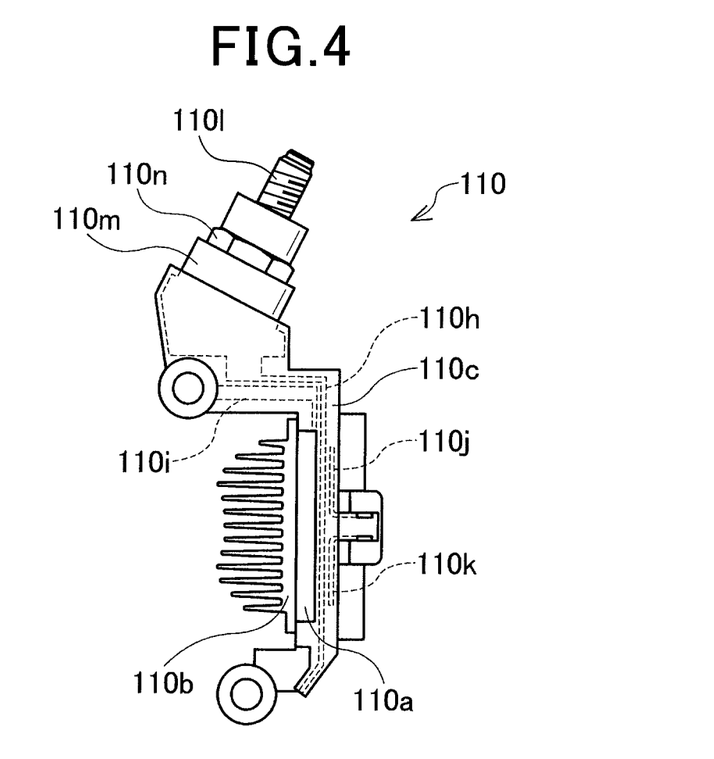
FIG. 4 is a plane view of a power supply terminal-included power assembly installed in the controller-included rotating electrical machine of FIG. 3.

The heat sink 110b is, as illustrated in FIGS. 3 and 4, a metallic member which dissipates heat generated by the power module 110a.

The power supply terminal-included bus bar assembly 110c is an assembly of parts to wire the power module 110a. Specifically, the power supply terminal-included bus bar assembly 110c, as illustrated in FIG. 5, has bus bars 110h to 111k, as will be described later, which are retained by resin, in other words, fixedly disposed in a resin mold and used for wiring the power module 110a and also has mounted thereon the power supply terminal 110l, as will be described later, which is joined to the bus bar 110h. The power supply terminal-included bus bar assembly 110c is, as can be seen in FIG. 4, equipped with the bus bar 110h to 110k, the power supply terminal 110l, and the fixation member 110m.

The bus bar 110h is, as shown in FIG. 5, a metallic plate which connects drains of the MOSFETs 110d and 110f to the positive terminal of the battery B1. The bus bar 110i is made of a metallic plate which connects sources of the MOSFETs 110e and 110g to the grounded housing 100 of the rotating electrical machine 10, thereby connecting them to the grounded negative pole of the battery B1. The bus bar 110j is made of a metallic plate which connects a joint at which the MOSFETs 110d and 110e are connected together in series to the first winding 101c of the stator winding 101b. The bus bar 110k is a metallic plate which connects a joint at which the MOSFETs 110f and 110g are connected together in series to the first winding 101c of the stator winding 101b. The bus bars 110h to 110k are, as can be seen in FIG. 4, arranged at given intervals away from each other and retained together by resin.

The power supply terminal 110l is, as can be seen in FIGS. 3 and 4, made of a metallic member in the form of a bolt to which wire, i.e., an electrical conductor extending from the positive pole of the battery B1 is joined. The fixation member 110m is, as shown in FIGS. 3 and 4, made of a metallic plate which works as a stay which fixes the power supply terminal 110l on the power assembly 110.

Figure 6:
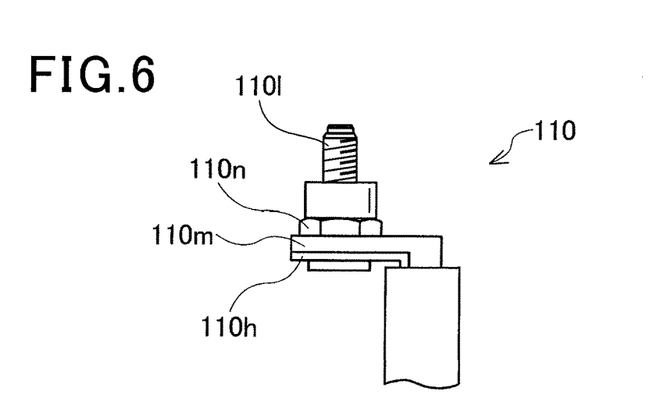
FIG. 6 is a side view which show a region around a fixation member of the power supply terminal-included power assembly of FIG. 4.

The fixation member 110m is, as can be seen in FIG. 6, placed in contact with the bus bar 110h joined to the power supply terminal 110l and integrally retained by resin (i.e., a resin mold) together with the bus bars 110h to 110k. The power supply terminal 110l is secured by the nut 110n to the fixation member 110m with which the bus bar 110h is in contact. Therefore, the bus bar 110h is joined to the fixation member 110m through the power supply terminal 110l in contact with the fixation member 110m, so that it is connected to the power supply terminal 110l.

The power module 110a is, as can been seen in FIG. 4, connected to the bus bars 110h to 110k and retained by the power supply terminal-included bus bar assembly 110c. The heat sink 110b is secured to the power module 110a.

The power assembly 111 illustrated in FIG. 3 is an assembly of parts which constitute the inverter circuit and the rectifier circuit. The power assembly 111 is, as shown in FIGS. 3 and 7, equipped with the power module 111a, the heat sink 111b, and the bus bar assembly 111c.

The power module 111a is, as illustrated in FIG. 5, made of a switching device module equipped with four switching devices: MOSFETs 111d to 111g which constitute the inverter circuit and the rectifier circuit. The MOSFETs 111d and 111e are connected in series. Similarly, the MOSFETs 111f and 111g are connected in series. The MOSFETs 111d and 111f are joined at sources thereof to drains of the MOSFETs 111e and 111g.

Figure 7:
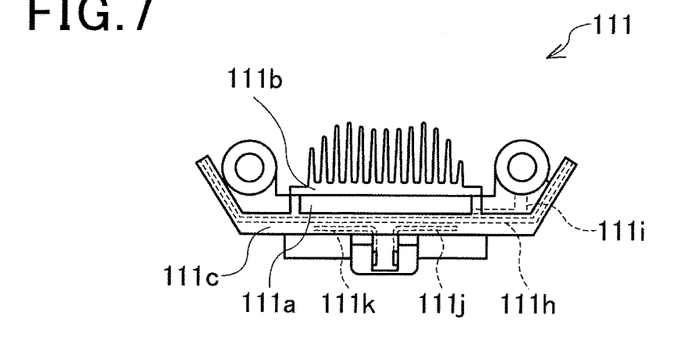
FIG. 7 is a plane view of one of power assemblies installed in the controller-included rotating electrical machine of FIG. 3.

The heat sink 111b is, as illustrated in FIGS. 3 and 7, made of a metallic member which dissipates heat, as generated by the power module 111a.

The bus bar assembly 111c is an assembly of parts which electrically wire the power module 111a. Specifically, the bus base assembly 111c has bus bars 111h to 111k, as will be described later, which electrically wire the power module 111a and are retained by resin, in other words, fixedly disposed in a resin mold. The bus bar assembly 111c is, as illustrated in FIG. 7, equipped with bus the bars 111h to 111k.

The bus bar 111h is, as can be seen in FIG. 5, made of a metallic plate which connects drains of the MOSFETs 111d and 111f to the positive pole of the battery B1 through the bus bar 110h. The bus bar 111i is made of a metallic plate which joints the sources of the MOSFETs 111e and 111g to the grounded housing 100 of the rotating electrical machine 100 through the bus bar 110i, thereby connecting them to the grounded negative pole of the battery B1. The bus bar 111j is made of a metallic plate which connects a joint at which the MOSFETs 111d and 111e are connected in series to the first winding 101c of the stator winding 101b. The bus bar 111k is a metallic plate which connects a joint at which the MOSFETs 111f and 111g are connected in series to the second winding 101d of the stator winding 101b. The bus bars 111h to 111k are, as can be seen in FIG. 7, arranged at given intervals away from each other and retained together by resin.

The power module 111a is connected to the bus bar 111h to 111k and secured to the bus bar assembly 111c. The heat sink 111b is attached to the power module 111a.

The power assembly 112 illustrated in FIG. 3 is an assembly of parts which constitute the inverter circuit and the rectifier circuit. The power assembly 111 is, as shown in FIGS. 3 and 8, equipped with the power module 112a, the heat sink 112b, and the bus bar assembly 112c.

The power module 112a is, as illustrated in FIG. 5, made of a switching device module equipped with four switching devices: MOSFETs 112d to 112g which constitute the inverter circuit and the rectifier circuit. The MOSFETs 112d and 112e are connected in series. Similarly, the MOSFETs 112f and 112g are connected in series. The MOSFETs 112d and 112f are joined at sources thereof to drains of the MOSFETs 112e and 112g.

Figure 8:
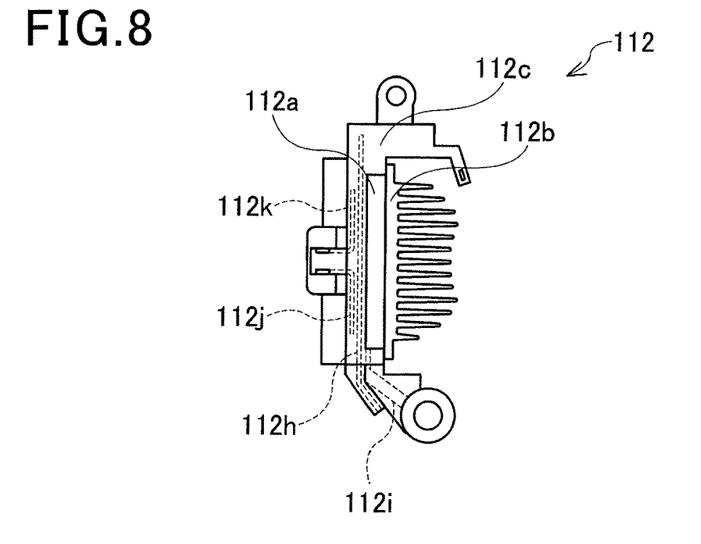
FIG. 8 is a plane view of one of power assemblies installed in the controller-included rotating electrical machine of FIG. 3.

The heat sink 112b is, as illustrated in FIGS. 3 and 8, made of a metallic member which dissipates heat, as generated by the power module 112a.

The bus bar assembly 112c is an assembly of parts which electrically wire the power module 112a. Specifically, the bus base assembly 112c has bus bars 112h to 112k, as will be described later, which electrically wire the power module 112a and are retained by resin, in other words, fixedly disposed in a resin mold. The bus bar assembly 112c is, as illustrated in FIG. 8, equipped with bus the bars 112h to 112k.

The bus bar 112h is, as can be seen in FIG. 5, made of a metallic plate which connects drains of the MOSFETs 112d and 112f to the positive pole of the battery B1 through the bus bars 110h and 111h. The bus bar 112i is made of a metallic plate which joints the sources of the MOSFETs 112e and 112g to the grounded housing 100 of the rotating electrical machine 100 through the bus bars 110i and 111i, thereby connecting them to the grounded negative pole of the battery B1. The bus bar 112j is made of a metallic plate which connects a joint at which the MOSFETs 112d and 112e are connected in series to the second winding 101d of the stator winding 101b. The bus bar 111k is a metallic plate which connects a joint at which the MOSFETs 112f and 112g are connected in series to the second winding 101d of the stator winding 101b. The bus bars 112h to 112k are, as can be seen in FIG. 8, arranged at given intervals away from each other and retained together by resin.

The power module 112a is connected to the bus bar 112h to 112k and secured to the bus bar assembly 112c. The heat sink 112b is attached to the power module 112a.

Figure 9:
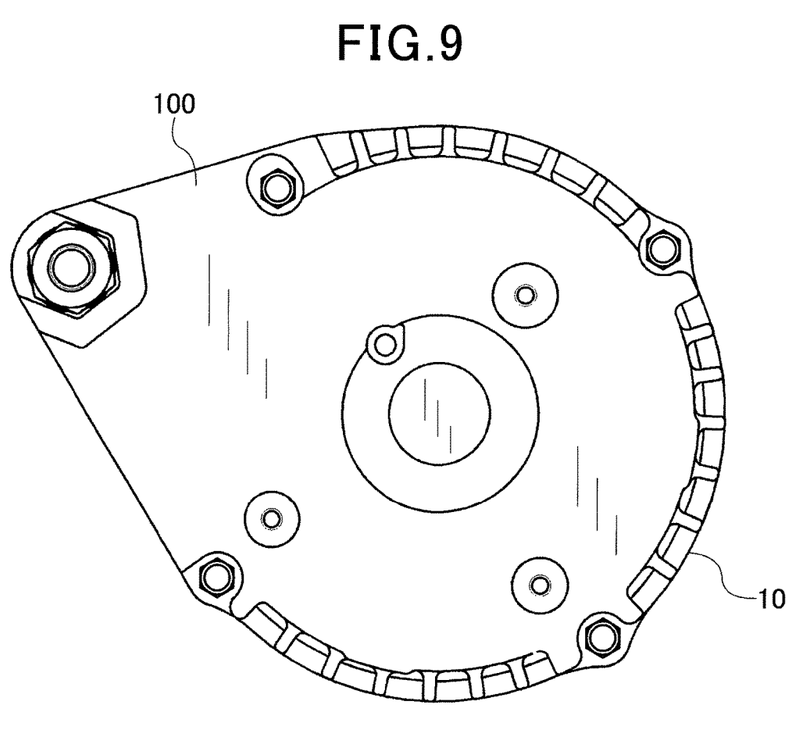
FIG. 9 is a plane view of a housing in which a power supply terminal-included power assembly and power assemblies are installed.
Figure 10:
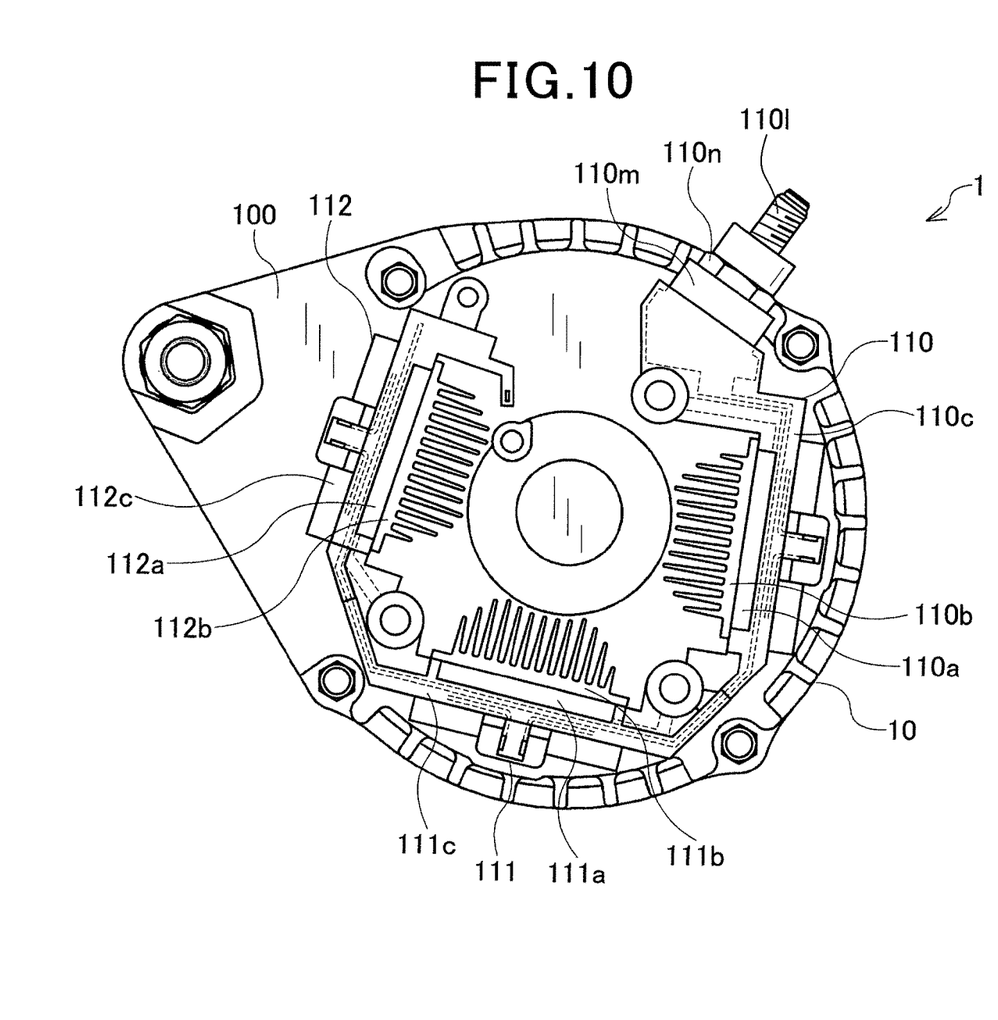
FIG. 10 is a plane view which illustrates a power supply terminal-included power assembly and power assemblies disposed in a controller-included rotating electrical machine of an embodiment.

The power supply terminal-included power assembly 110 and the power assemblies 111 and 112 are disposed on one of axially-opposed ends, as illustrated in FIG. 9, of the housing 110 of the rotating electrical machine 10. The power supply terminal-included power assembly 110 and the power assemblies 111 and 112 are, as clearly illustrated in FIG. 10, arranged adjacent each other in the form of a U-shape and, as illustrated in FIG. 3, secured to the housing 100 of the rotating electrical machine 10 using the bolts 114

The bus bars 110h and 111h and the bus bars 111h and 112h in FIGS. 4, 7, and 8 are connected together in a way, as illustrated in FIG. 5. Similarly, the bus bars 110 and 111i and the bus bars 111i and 112i in FIGS. 4, 7, and 8 are connected together in a way as illustrated in FIG. 5. The bus bar 110i is secured to the housing 100 of the rotating electrical machine 10 attached to a body of the vehicle and connected, as illustrated in FIG. 5, to the negative pole of the battery B1 through the body of the vehicle. The bus bar 110j, 110k, and 111j in FIGS. 5, 7, and 8 are connected in a way, as illustrated in FIG. 5, to the first winding 101c that is a portion of the stator winding 101b. The bus bar 111k, 112j, and 112k in FIGS. 4, 7, and 8 are connected in a way, as illustrated in FIG. 5, to the second winding 101d that is a portion of the stator winding 101b.

The cover 113 is, as shown in FIG. 2, made of resin and covers the power supply terminal-included power assembly 110 and the power assemblies 111 and 112. The cover 113 is secured to the housing 100 to cover the power supply terminal-included power assembly 110 and the power assemblies 111 and 112 with an end of the power supply terminal 110l exposed outside the cover 113.

The operation of the controller-included rotating electric machine 1 will be described below with reference to FIGS. 1 and 5. The controller-included rotating electric machine 1 is operable in either of a motor mode and a generator mode.

The motor mode to produce drive power for the vehicle will first be discussed.

When an ignition switch of the vehicle is turned on, direct current flows through the rotor winding 102c through the brushes 104 and the slip rings 103 illustrated in FIG. 1. The flow of direct current through the rotor winding 102c will cause magnetic poles to be created on the outer peripheral surface of the rotor 102. Additionally, when the ignition switch is turned on, the direct current is, as illustrated in FIG. 5, also delivered from the battery B1 to the power modules 110a, 111a, and 112a. The MOSFETs 110d to 110g, 111d, and 111e which constitute the inverter circuit are subjected to given switching operations to convert the direct current, as inputted from the battery B1, into three-phase alternating current. The MOSFETs 111f and 111g and 112d to 112g which constitute the inverter circuit are also subjected to switching operations to convert the direct current, as delivered from the battery B1 into three-phase alternating current.

This causes the three-phase currents to be supplied to the first winding 101c and the second winding 101d, respectively, so that the rotating electrical machine 10 produces power or torque to drive the vehicle.

Next, the generator mode to produce electric power to charge the battery B1 will be described below.

When the direct current is supplied to the rotor winding 102c of FIG. 1, so that the magnetic poles are developed on the outer peripheral surface of the rotor 102, and the drive power is delivered from the engine to the controller-included rotating electrical machine 1, each of the first winding 101c and the second winding 101d generates three-phase alternating current. The MOSFETs 110d to 110g, 111d, and 111e are subjected to switching operations, so that they work as the rectifier circuit to rectify the three-phase current, as created by the first winding 101c. Similarly, the MOSFETs 111f and 111g, and 112d to 112g are subjected to switching operations, so that they work as the rectifier circuit to rectify the three-phase alternating current, as created by the second winding 101d. This causes the three-phase alternating currents, as generated by the first winding 101c and the second winding 101d, to be converted into direct currents and then delivered to the battery B1. The battery B1 is, therefore, charged by the electric power generated by the rotating electrical machine 10.

The controller-included rotating electrical machine 1 offers the following beneficial advantages.

The conventional controller-included rotating electrical machine is, as described already, equipped with discrete assemblies one of which has the power supply terminals mounted therein and others of which have the bus burs installed therein. In contrast, the controller 11 of this embodiment includes the power supply terminal-included bus bar assembly 110c and the bus bar assemblies 111c and 112c. The power supply terminal-included bus bar assembly 110c has the bus bars 110h to 111k which electrically wire the MOSFETs 110d to 110g and are retained therein by resin and also has the power supply terminal 110l joined to the bus bar 110h. In other words, the power supply terminal 110l is disposed in the power supply terminal-included bus bar assembly 110c along with the bus bars 110h to 110k. This results in a decreased total number of parts of the controller-included rotating electrical machine 1 as compared with the conventional structure.

The power supply terminal-included bus bar assembly 110c is equipped with the fixation member 110m which is retained by a resin member along with the bus bars 110h to 110k and serves as a metallic mount plate to which the power supply terminal 110l is secured. The bus bar 110h joined to the power supply terminal 110l is, as can be seen in FIG. 6, secured by the power supply terminal 110l to the fixation member 110m in direct contact therewith, thereby eliminating the need for an additional fastener, such as a bolt, for use in joining the bus bar 110h to the fixation member 110m. This results in decreased numbers of parts and production steps of the controller-included rotating electrical machine 1.

The controller 11 is equipped with the power modules 110a, 111a, and 112a, the power supply terminal-included bus bar assembly 110c, and the bus bar assemblies 111c and 112c. The power supply terminal-included bus bar assembly 110c is an assembly of parts to wire the power module 110a. The bus bar assembly 111c is an assembly of parts to wire the power module 111a. The bus bar assembly 112c is an assembly of parts which electrically wire the power module 112a. In other words, the power supply terminal-included bus bar assembly 110c, the bus bar assembly 111c, and the bus bar assembly 112c are provided one for each of the power modules 110a, 111a, and 112a. If, therefore, one of the power modules 110a, 111a, and 112a is found to be malfunctioning when the controller-included rotating electrical machine 1 is produced, only a combination of it and a corresponding one of the power supply terminal-included bus bar assembly 110c, the bus bar assembly 111c, and the bus bar assembly 112c may be replaced with a new one, thereby avoiding unnecessary part replacement.

The power supply terminal-included bus bar assembly 110c and the bus bar assemblies 111c and 112c are, as described above, arranged adjacent each other and secured by the bolts 114 to the housing 100 of the rotating electrical machine 10. This eliminates the need for two types of bolts: one used to fixedly arrange the power supply terminal-included bus bar assembly 110c and the bus bar assemblies 111c and 112c to be adjacent each other, and one used to join them to the housing 100 of the rotating electrical machine 10, thus resulting in decreased numbers of parts and production steps of the controller-included rotating electrical machine 1. The power supply terminal-included bus bar assembly 110c and the bus bar assemblies 111c and 112c are disposed next to each other, thereby facilitating the ease with which the bus bars are connected together among them in a short time.

Figure 11:
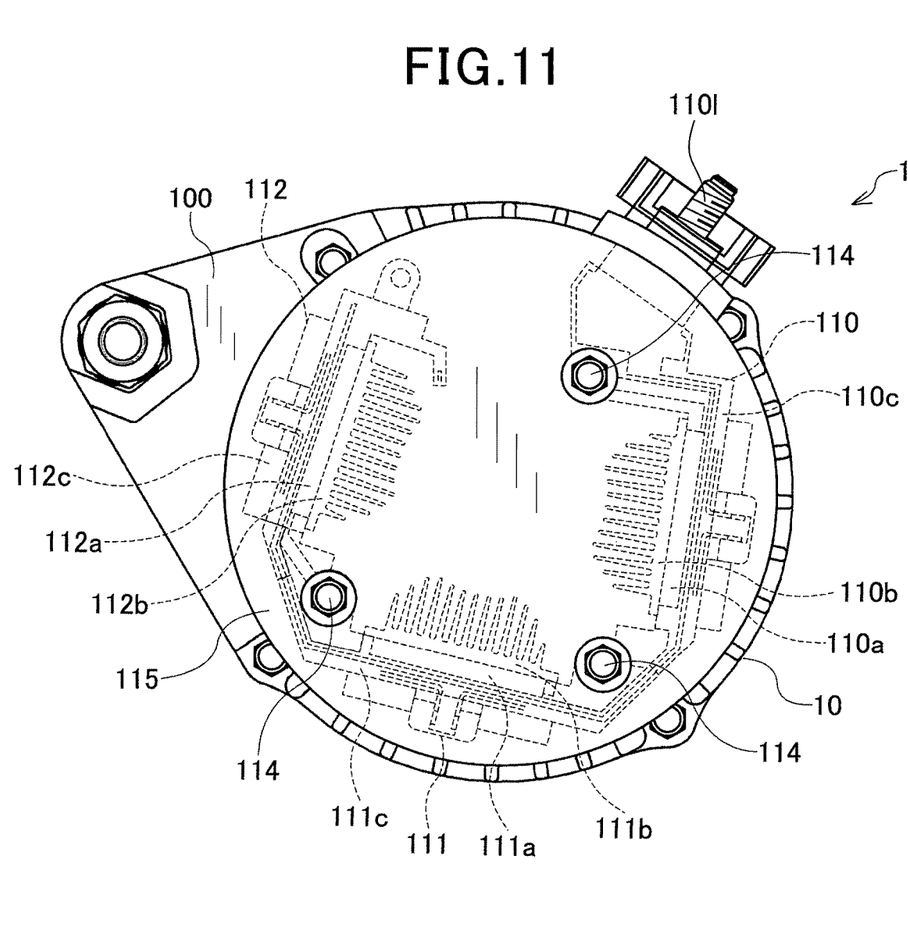
FIG. 11 is a plane view which illustrates a modified form of a controller-included rotating electrical machine, as viewed from a direction facing a controller.

The power supply terminal-included bus bar assembly 110c and the bus bar assemblies 111c and 112c are, as described above, secured to the housing 100 of the rotating electrical machine 10 using the bolts 114. The cover 113 is also secured to the housing 100 to cover the power modules 110a, 111a, and 112b, the heat sinks 110b, 111b, and 112b, the power supply terminal-included power assembly 110, and the power assemblies 111 and 112. These arrangements may be modified. For example, the controller-included rotating electrical machine 1 may alternatively, as illustrated in FIG. 11, include the cover 115 instead of the cover 113. The cover 115 is fixedly attached to the housing 100 of the rotating electrical machine 10 using the bolts 114 together with the power supply terminal-included bus bar assembly 110c and the bus bar assemblies 111c and 112c. This eliminates the need for additional bolts for use only in joining the cover 115 to the housing 100, thus resulting in further decreased numbers of parts and production steps of the controller-included rotating electrical machine 1.

The controller 11 is equipped with twelve switching devices: the MOSFETs 110d to 110g, 111d to 111g, and 112d to 112g, but not limited thereto. The controller 11 may only need to have a plurality of switching devices.

The controller 11, as described above, includes three switching device modules: the power modules 110a, 111a, and 112a each equipped with four MOSFETs, but not limited thereto. Each of the power modules 110a, 11a, and 112a may only need to have a plurality of switching devices. The controller 11 may only need to have a plurality of power modules.

The controller 11 includes the two bus bar assemblies 111c and 112c, but not limited thereto. The controller 11 may only need to have at least one bus bar assembly.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A controller-included rotating electrical machine comprising:
    a rotating electrical machine;
    a plurality of switching device modules each of which includes a plurality of switching devices and constitutes an inverter circuit working to supply alternating current to the rotating electrical machine and a rectifier circuit working to rectify alternating current, as delivered from the rotating electrical machine;
    a power supply terminal-included bus bar assembly which includes a plurality of kinds of bus bars which electrically wire one of the plurality of switching device modules and are fixedly retained by a resin member, the power supply terminal-included bus bar assembly also including a power supply terminal for connection with an electrical conductor extending from a positive pole of a power supply, the power supply terminal being joined to one of the bus bars; and
    at least one other bus bar assembly which includes a plurality of kinds of bus bars which electrically wire one of the plurality of switching device modules and are fixedly retained by a resin member.

2. The controller-included rotating electrical machine as set forth in claim 1, wherein the power supply terminal-included bus bar assembly includes a metallic fixation member which is fixedly retained by the resin member with the bus bars of the power supply terminal-included bus bar assembly and secures the power supply terminal thereto, and wherein the one of the bus bars which is joined to the power supply terminal is secured by the power supply terminal to the fixation member in contact with the fixation member.

3. The controller-included rotating electrical machine as set forth in claim 1, wherein the power supply terminal-included bus bar assembly and the at least one other bus bar assembly are provided one for each of the plurality of switching device modules.

4. The controller-included rotating electrical machine as set forth in claim 1, wherein the power supply terminal-included bus bar assembly and the at least one other bus bar assembly are arranged adjacent each other and secured to a housing of the rotating electrical machine using a bolt.

5. The controller-included rotating electrical machine as set forth in claim 4, further comprising:
    a cover which is secured to the housing of the rotating electrical machine using the bolt together with the power supply terminal-included bus bar assembly and the at least one other bus bar assembly to cover the plurality of switching device modules, the power supply terminal-included bus bar assembly, and the at least one other bus bar assembly.

* * * * *